April 5, 1938.  R. G. AURIEN  2,113,339
BRAKE ARRANGEMENT
Filed Feb. 8, 1936  2 Sheets-Sheet 2
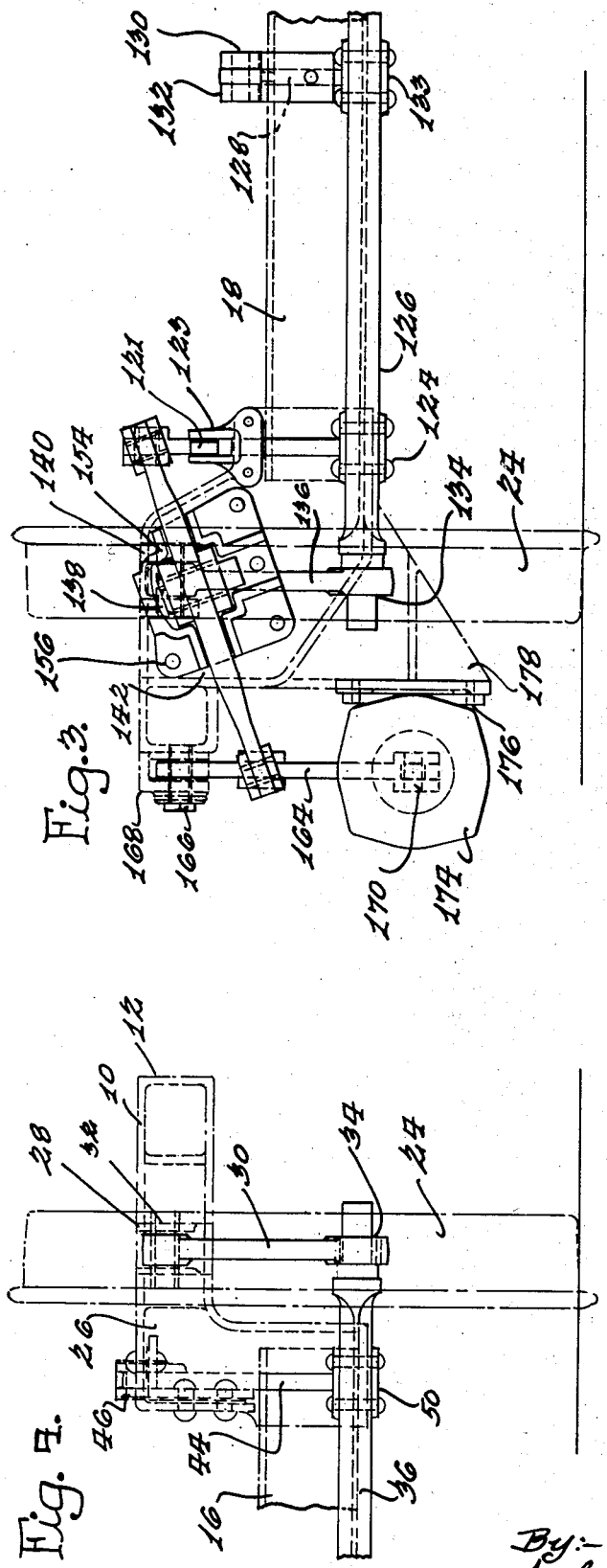
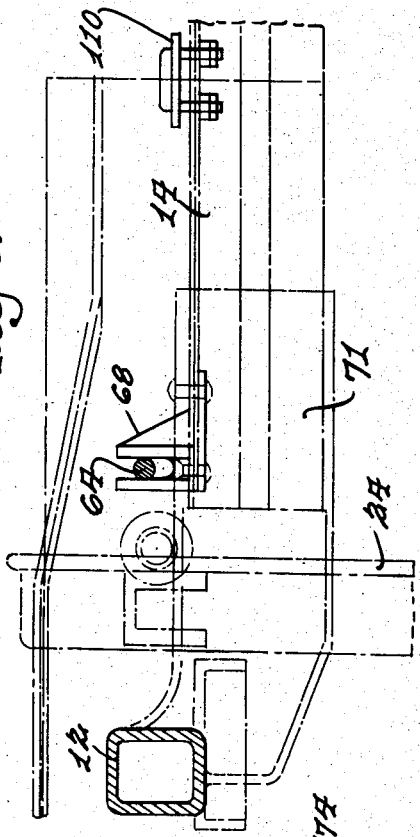
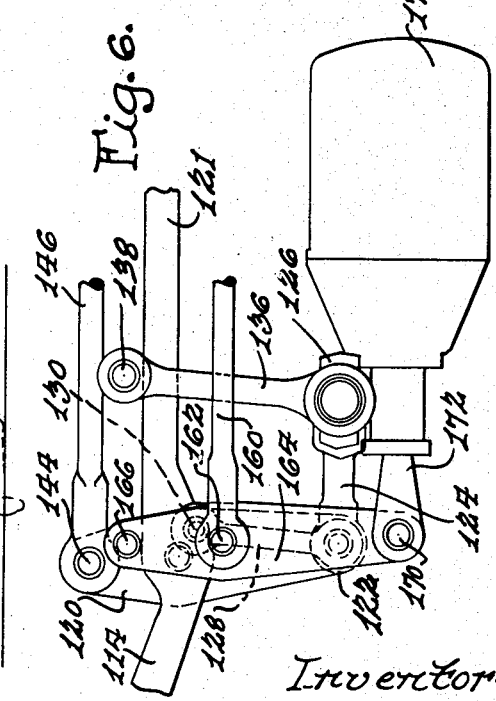
Inventor:-
Ray G. Aurien
By:-
Wilkinson, Huxley, Byron & Knight
Attys.

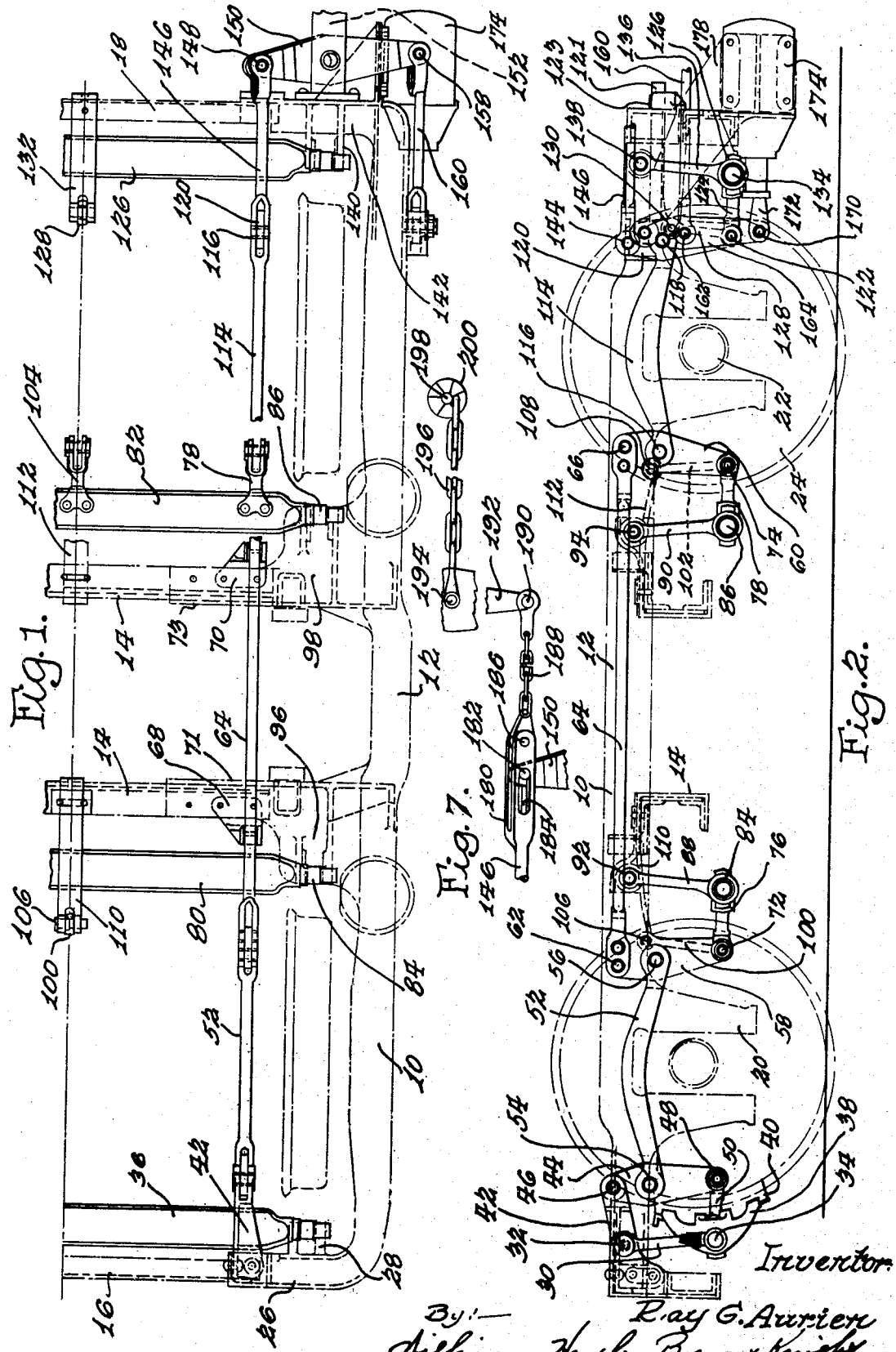

Patented Apr. 5, 1938

2,113,339

UNITED STATES PATENT OFFICE 2,113,339

BRAKE ARRANGEMENT

Ray G. Aurien, Chicago, Ill., assignor to American Steel Foundries, Chicago, Ill., a corporation of New Jersey Application February 8, 1936, Serial No. 63,011

19 Claims. (Cl. 188—56)

This invention pertains to brake mechanism, and more particularly to truck brakes for railway rolling stock.

An object of the invention is to provide a simple and compact brake organization wherein the various parts are accessible, and wherein clearance conditions are improved over ordinary types of brake mechanism.

Another object is to provide brake mechanism wherein an operating cylinder is provided below the axis of the wheel and axle assemblies for permitting the application of low center of gravity car bodies to the supporting trucks.

Still another object is to provide brake mechanism for railway rolling stock wherein and whereby the pressures at different points in the mechanism are greatly reduced over the ordinary type of brake mechanism.

A further object is to provide an improved brake arrangement wherein two cylinders per truck are connected to clasp brakes in a manner to meet all service conditions for successful operation.

A yet further object is to provide an improved brake arrangement wherein the lever ratio of the pressure operated levers will be considerably reduced, resulting in a substantial decrease in the working pressures at various points in the arrangement.

A still further object is to provide pressure operated brake means on a railway truck for a low center of gravity car, and one which is readily adaptable for emergency hand operation.

With these and various other objects in view, the invention may consist of certain novel features of construction and operation as will be more fully described and particularly pointed out in the specification, drawings and claims appended hereto.

In the drawings, which illustrate an embodiment of the device, and wherein like reference characters are used to designate like parts—

Figure 1 is a fragmentary top plan view of a truck construction having a brake arrangement embodying the invention applied thereto;

Figure 2 is a side elevation of the truck construction illustrated in Figure 1;

Figure 3 is a fragmentary end elevation of the truck construction as viewed from the right of Figures 1 and 2;

Figure 4 is a fragmentary end elevation of the truck construction as viewed from the left of Figures 1 and 2;

Figure 5 is a transverse fragmentary sectional elevation taken substantially in the plane of the transverse center line of the truck;

Figure 6 is a fragmentary top plan view, showing more or less diagrammatically the connection between the brake arrangement and hand operating means.

Figure 7 is a fragmentary view illustrating a construction which may be employed for hand operation of the brake arrangement.

While only one half of the truck construction and brake arrangement is illustrated in the figures, it is of course appreciated that the truck construction and brake arrangement for the opposite side of the truck is a substantial duplicate of that described herein.

The truck frame 10 includes the side frame 12, opposite side frames being connected by the spaced transoms 14 and the end rails 16 and 18. The side frame is provided with the spaced pedestals 20 adapted to accommodate suitable journal boxes (not shown) having cooperative relation with the journal ends 22 of the spaced wheel and axle assemblies 24. The side frame 10 is provided with the end bracket 26 for attachment of the end rail 16, said bracket being provided with the hanger bracket 28 to which the brake hanger 30 is pivoted as at 32 to be disposed in the plane of the adjacent wheel. The lower end of the brake hanger 30 is pivotally connected as at 34 to the brake beam 36, said brake beam being provided with the brake head 38 having the usual brake shoe 40 provided thereon for braking cooperation with the adjacent wheel.

The bracket 26 also is provided with the truck or brake lever bracket 42 disposed inboard of the wheel, and the dead truck lever 44 is pivoted to said bracket as at 46, the lower end of said truck lever being pivotally connected as at 48 to the fulcrum 50 secured to the brake beam 36. The pull rod 52 is disposed above the axle of the wheel and axle assembly and is pivoted at its outer end to the dead truck lever as at 54, the opposite or inner end of said pull rod being pivotally connected as at 56 to the live truck lever 58 intermediate the ends of said truck lever.

The live truck lever 60 is similar to the opposite inner truck live lever 58, but it disposed adjacent the other wheel and axle assembly. The upper end of the live truck lever 58 is adjustably connected as at 62 to the pull rod 64, the opposite end of said pull rod being adjustably connected as at 66 to the upper end of the live truck lever 60. The guide brackets 68 and 70 may be provided with anti-friction rollers and are disposed on the spaced transom brackets 71 and 73 guiding and supporting the pull rod 64. The lower ends of the live truck levers 58 and 60 are pivotally connected as at 72 and 74 to similar fulcrums 76 and 78 secured to the similar inner brake beams 80 and 82, the outer ends of said brake beams being pivotally connected as at 84 and 86 to the hangers 88 and 90, the upper ends of said hangers being pivotally connected as at 92 and 94 to the brackets 96 and 98 disposed between the transom brackets 71 and 73 and the side frame 12.

It is of course understood that the outer ends of the brake beams 80 and 82 are provided with suitable brake heads (not shown) for braking cooperation with the respective adjacent wheels. The brake beams 80 and 82 are supported adjacent the longitudinal center line of the truck by means of the balance hangers 100 and 102, the lower ends of said hangers being pivotally connected to suitable fulcrums such as shown at 104 in Figure 1, said fulcrum being provided on the brake beam 82, though the brake beam 80 is provided with a similar fulcrum (not shown). The upper ends of said hangers are pivotally connected as at 106 and 108 to the balance hanger brackets 110 and 112 provided on the transoms.

The pull rod 114 is pivotally connected as at 116 to the truck lever 60 intermediate the ends of said truck lever, and extends over the adjacent axle and is pivotally connected as at 118 to the live truck lever 120 intermediate the ends of said truck lever, said pull rod being preferably provided with an extension 121 extending through the pull rod guide 123 provided on the end rail bracket 142. The lower end of said truck lever is pivotally connected as at 122 to the fulcrum 124 secured to the outer brake beam 126, said brake beam likewise being provided with suitable brake heads (not shown) for braking cooperation with the adjacent wheel. The brake beam 126 is also supported by means of a balance hanger 128 adjacent the longitudinal center line of the truck, the upper end of said hanger being pivotally connected as at 130 to the balance hanger bracket 132 supported on the end rail 18, the lower end of said balance hanger being pivoted to a suitable fulcrum 133 provided on the brake beam 126.

The outer end of the brake beam 126 is pivotally connected as at 134 to the hanger 136, the upper end of said hanger being pivotally connected as at 138 to the hanger bracket 140 provided on the end bracket 142 of the side frame 10. The upper end of the live truck lever 120 is pivotally connected as at 144 to the pull rod 146, the outer end of said pull rod being pivotally connected as at 148 to the inner end of the auxiliary lever 150. The auxiliary lever 150 extends outwardly and downwardly and is pivotally connected intermediate the ends thereof as at 152 to the automatic slack adjuster 154 mounted on the bracket 142 as at 156, said slack adjuster being of suitable construction as that of the American Brake Company, and/or as shown in Patent No. 1,991,330 to Mitchell, granted February 12, 1935. The outer end of the auxiliary lever 150 is pivotally connected as at 158 to the pull rod 160, said pull rod being pivotally connected as at 162 to the cylinder lever 164 intermediate the ends of said cylinder lever.

The upper end of the substantially vertically disposed cylinder lever 164 is pivotally connected as at 166 to the bracket 168 provided on the side frame. The lower end of said dead cylinder lever is pivotally connected as at 170 to the piston rod 172 of the operating cylinder 174. The operating cylinder is suitably connected as at 176 to the depending bracket 178 provided on the end rail bracket 142 and side frame 10.

In the event it is desired to apply hand operating means to the brake arrangement this may be accomplished as indicated generally in Figure 7. In this case the pull rod 146 is provided with an elongated bifurcated end 180 adapted to receive the upper inner end of the auxiliary lever 150, said lever being loosely pivoted at 182 to the end 180 through the elongated slots 184. The outer ends of the end 180 are pivoted as at 186 to the chains 188 which are pivoted as at 190 to the ends of the equalizer bar 192 which may be carried by the truck frame or car body on suitable brackets or straps (not shown). The equalizer bar is pivoted as at 194 adjacent the center thereof to the chain 196, the opposite end of which is connected to the brake staff 198 of the hand operating means 200.

Assuming the brake arrangement to be in inoperative position, when it is desired to apply the brakes, fluid pressure introduced to the cylinder 174 causes the piston 172 to move toward the left as viewed in Figure 2, causing movement of the dead cylinder lever in a clockwise direction about its pivot 166. Movement of the cylinder lever in a clockwise direction causes the pull rod 160 to move the auxiliary lever 150 in a clockwise direction as viewed in Figure 1, thus moving the pull rod 146 toward the right as viewed in said figure. Movement of the pull rod 146 causes the truck lever 120 to pivot about the connection 118 to move the brake beam 126 to a position to apply its brake head and shoe assemblies to braking position.

Continued movement of the pull rod 146 causes movement of the pull rod 114 to move the live truck lever 60 to apply the brake shoes provided on the beam 82. Movement of the truck lever 60 toward the right causes the pull rod 64 to move toward the right, thus moving the live truck lever 58 in a clockwise direction about its pivot 56 to apply the brake shoes provided on the beam 80. Continued movement of the live truck lever 58 causes the pull rod 52 to move the dead truck lever 44 in a counter-clockwise direction to move the brake beam 36 to apply the brake shoes 40 to the periphery adjacent the wheels. Release of the actuating fluid will permit release of the brake rigging in a direction opposite to that already described, it being understood that the automatic slack adjuster is operative as by the fluid supplied to the cylinder to take up slack in the brake system.

It is of course understood that rotation of the hand operating means 200 causes the chain 196 to move the equalizer bar 192 toward the right as viewed in Figure 7, thus causing the chains 188 to move the pull rod 146 at each side of the truck to operate the brake arrangement in the same manner as described for the brake cylinder.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a truck frame including a side frame, spaced connecting transoms and end rails, spaced wheel and axle assemblies for supporting said truck frame, a live and dead truck lever disposed on opposite sides of one of said wheels, live truck levers disposed on opposite sides of another wheel, a pull rod connecting truck levers at each wheel, a pull rod connecting the live lever of one wheel to a live lever of an adjacent wheel, an auxiliary lever pivoted intermediate the ends thereof to said truck frame and pivoted adjacent one end thereof to a live truck lever, a substantially vertically disposed cylinder lever pivoted to said truck frame adjacent the upper end thereof, a pull rod connected to the other end of said auxiliary lever and to said cylinder lever intermediate the ends of said cylinder lever, an operating cylinder supported on said side frame, the piston of said cylinder being connected to the lower end of said cylinder lever.

2. In brake mechanism, the combination of a substantially vertically disposed truck lever, a horizontally disposed brake cylinder, a substantially vertically disposed cylinder lever pivotally supported adjacent the upper end thereof, the lower end of said cylinder lever being operatively connected to the piston of said cylinder, and connecting means including a transversely disposed lever between said cylinder lever and said truck lever.

3. In brake mechanism, the combination of a substantially vertically disposed truck lever, a horizontally disposed brake cylinder, a substantially vertically disposed cylinder lever pivotally supported adjacent the upper end thereof, the lower end thereof being operatively connected to the piston of said cylinder, a transversely disposed fulcrum lever connected to said cylinder lever, and means connecting said fulcrum lever to said truck lever.

4. In brake mechanism, the combination of a truck frame, a horizontally disposed brake cylinder secured to said frame at one side thereof, a substantially vertically disposed cylinder lever pivoted adjacent one end thereof to said truck frame and operatively connected adjacent the other end thereof to the piston of said cylinder, a substantially vertically disposed truck lever, a fulcrum lever connected to said cylinder lever and to said truck lever, and a slack adjuster pivotally connected to said fulcrum lever and operatively connected to said cylinder, said slack adjuster being supported on said truck frame.

5. In brake mechanism, the combination of a truck frame, a horizontally disposed brake cylinder secured to said frame at one side thereof, a substantially vertically disposed cylinder lever pivoted adjacent one end thereof to said truck frame and operatively connected adjacent the other end thereof to the piston of said cylinder, a truck lever, a fulcrum lever connected to said cylinder lever and to said truck lever, a slack adjuster pivotally connected to said fulcrum lever and operatively connected to said cylinder, said slack adjuster being supported on said truck frame, and supplementary brake operating means connected to said fulcrum lever.

6. In brake mechanism, the combination of a truck frame, a horizontally disposed brake cylinder, a substantially vertically disposed cylinder lever, a transversely disposed fulcrum lever, said cylinder lever being operatively connected to the piston of said brake cylinder and to said fulcrum lever, one of said levers being fulcrumed intermediate the ends thereof to the truck frame, and the other of said levers being fulcrumed adjacent one end thereof to said truck frame, and truck brake means connected to said fulcrum lever.

7. In brake mechanism, the combination of a truck frame, a horizontally disposed brake cylinder, a substantially vertically disposed cylinder lever, a transversely disposed fulcrum lever, said cylinder lever being operatively connected to the piston of said brake cylinder and to said fulcrum lever, said cylinder lever being fulcrumed adjacent one end thereof to said truck frame, said fulcrum lever being fulcrumed intermediate the ends thereof to said truck frame, and truck brake means connected to said fulcrum lever.

8. In brake mechanism, the combination of a truck frame, a brake cylinder secured adjacent an end of said truck frame, a substantially vertically disposed cylinder lever fulcrumed adjacent one end thereof to said truck frame and operatively connected to the piston of said cylinder, a slack adjuster supported on said truck frame and connected to said brake cylinder, a transversely disposed fulcrum lever pivotally connected intermediate the ends thereof to said slack adjuster and connected adjacent one end thereof to said cylinder lever intermediate the ends of said cylinder lever, and brake operating means connected to the other end of said fulcrum lever.

9. In brake mechanism, the combination of a truck frame, a brake cylinder secured adjacent an end of said truck frame, a substantially vertically disposed cylinder lever fulcrumed adjacent one end thereof to said truck frame and operatively connected to the piston of said cylinder, a slack adjuster supported on said truck frame and connected to said brake cylinder, a transversely disposed fulcrum lever pivotally connected intermediate the ends thereof to said slack adjuster and connected adjacent one end thereof to said cylinder lever intermediate the ends of said cylinder lever, brake operating means connected to the other end of said fulcrum lever, and supplementary operating means connected to said fulcrum lever adjacent the latter end thereof.

10. In brake mechanism, the combination of a truck frame, a wheel and axle assembly supporting said truck frame, a brake cylinder mounted on said truck frame substantially below the axis of said wheel and axle assembly, a cylinder lever fulcrumed on said truck frame adjacent an end of said lever and substantially above said cylinder, the lower end of said cylinder lever being operatively connected to the piston of said cylinder, a fulcrum lever fulcrumed to said truck frame above said cylinder and operatively connected to said cylinder lever intermediate the ends thereof, and a truck lever disposed adjacent said wheel and axle assembly and operatively connected adjacent one end thereof to said fulcrum lever.

11. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, a brake cylinder mounted on said truck frame, a slack adjuster, a fulcrum lever connected to said slack adjuster and to one of said truck levers, and a substantially vertically disposed cylinder lever pivoted adjacent one end thereof to said truck frame and connected to said fulcrum lever and operatively connected to the piston of said brake cylinder.

12. In a car truck, the combination of a substantially vertically disposed live truck lever, a brake cylinder mounted on said truck adjacent an end thereof and operating in the direction of the other end of said truck, a substantially vertically disposed dead cylinder lever operatively associated with said cylinder, a fulcrum lever connected to said dead cylinder lever, and means connected to one end of said fulcrum lever and to one end of said truck lever by means of which the brakes are operated.

13. In brake mechanism, the combination of a truck frame, a wheel and axle assembly cooperating therewith, truck levers on opposite sides of said wheel and axle assembly, a connection between said truck levers disposed above the axle, brake shoes disposed on opposite sides of the wheel and connected to said truck levers, a brake cylinder mounted on said truck frame substantially below the axis of said wheel and axle assembly, a slack adjuster, a fulcrum lever connected to said slack adjuster and to one of said truck levers, and a cylinder lever pivoted to said truck frame and connected to said fulcrum lever and operated by said brake cylinder.

14. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, a brake cylinder mounted on said truck frame substantially below the axis of said wheel and axle assembly, a fulcrum lever pivotally mounted on said truck frame and connected to one of said truck levers, and a cylinder lever pivoted to said truck frame and connected to said fulcrum lever and operated by said brake cylinder.

15. In a brake arrangement, the combination of a truck frame, a wheel associated therewith, brake rigging associated with said wheel for braking cooperation therewith, a transversely disposed fulcrum lever pivoted at one end of the brake rigging and pivoted intermediate the ends thereof to said truck frame, a substantially vertically disposed cylinder lever pivoted intermediate the ends thereof to said fulcrum lever and connected at one end thereof to said truck frame, a brake cylinder mounted on said truck frame and having a piston connected to the other end of said cylinder lever.

16. In a brake arrangement, the combination of a truck frame, a brake cylinder mounted on said frame adjacent an end of said frame but provided with a piston operating in the direction of the other end of said truck frame, a substantially vertically disposed cylinder lever pivoted adjacent one end thereof to the truck frame and directly connected at the other end thereof to said piston, said cylinder lever being connected intermediate the ends thereof to said brake rigging.

17. In a brake arrangement, the combination of a truck frame, a horizontally disposed cylinder mounted thereon, a cylinder lever pivoted at its upper end to said truck frame, the lower end of said cylinder lever being connected to the piston of said cylinder, a substantially transversely disposed fulcrum lever pivoted intermediate its ends to said frame and connected adjacent its inner end to brake rigging, and a pull rod connecting said fulcrum and cylinder levers.

18. In a brake arrangement, the combination of a truck frame, a horizontally disposed cylinder mounted thereon, a vertically disposed cylinder lever pivoted at its upper end to said truck frame, the lower end of said cylinder lever being connected to the piston of said cylinder, a transversely disposed fulcrum lever pivoted intermediate its ends to said frame and connected at its outer end to said cylinder lever and connected adjacent its inner end to said brake rigging.

19. In a brake arrangement, the combination of a truck frame, a wheel, brake means associated with said wheel for braking application thereto, and spaced levers operatively connected together, one of said levers being substantially vertically disposed and the other of said levers being disposed transversely relative to said frame, one of said levers being pivoted to said frame at its end, the other of said levers being pivoted to its frame intermediate the ends thereof, one of said levers being connected to said brake means, and an operating cylinder having a piston connected to the other of said levers.

RAY G. AURIEN.